United States Patent [19]

Sivyer

[11] 4,324,945

[45] Apr. 13, 1982

[54] THERMOWELL APPARATUS FOR PETROCHEMICAL APPLICATIONS

[76] Inventor: Robert B. Sivyer, P.O. Box 40471, 1314 Beutel, Houston, Tex. 77055

[21] Appl. No.: 141,397

[22] Filed: Apr. 18, 1980

[51] Int. Cl.³ .......................... G01K 1/08; G01K 1/14
[52] U.S. Cl. .................................... 136/242; 73/349; 136/230
[58] Field of Search ............ 73/343 R, 349; 136/230, 136/242

[56] References Cited

U.S. PATENT DOCUMENTS

| | | | |
|---|---|---|---|
| 2,494,628 | 1/1950 | Oberding | 73/343 R X |
| 3,911,747 | 10/1975 | Sivyer | 73/343 R |
| 4,018,624 | 4/1977 | Rizzolo | 73/359 R X |

Primary Examiner—Daniel M. Yasich

[57] ABSTRACT

A thermowell apparatus for sensing temperature and supporting piping in a cracker furnace including a support member of 800H alloy material with a heavy construction for disposal in a high temperature furnace and a tip member arranged for welding to a pipe.

4 Claims, 2 Drawing Figures

THERMOWELL APPARATUS FOR PETROCHEMICAL APPLICATIONS

FIELD OF THE INVENTION

This invention relates to temperature sensing and support means for use in cracking furnaces and more particularly to thermowells which support piping in cracking furnaces.

BACKGROUND OF THE INVENTION

In the processing of gas oil or kerosene to ethylene, the liquid is fed in to piping which passes through a heated furnace and exits as a gas. The piping in the furnace is tortuously arranged in a vertical plane and supported from the roof of the furnace. One or more temperature sensing devices are used to sense the temperature of the fluids in the pipes for regulation of the temperature and rate of flow. Heretofore, the piping in the furnace has been independently supported with respect to the temperature sensing device. One such device is illustrated in U.S. Pat. No. 3,911,747.

One of the problems involved with temperature sensing devices is their longevity with respect to the piping. As a practical matter, if the temperature sensing device has a life expectancy matched with the life expectancy of the pipe then repairs and costs are reduced or minimized.

THE PRESENT INVENTION

The present invention includes a one piece temperature sensing assembly which is welded to the piping in a furnace. The temperature sensing assembly is constructed of materials and a wall configuration to minimize stress changes due to temperature effects and to support piping in a furnace and to have a comparable longevity to the life span of the piping. This is accomplished by optimizing wall cross-sections for optimum strength and selected welded locations and materials.

It is an object of this invention to provide a temperature sensing system for pipes in a cracking furnace where the system is matched to the life of the pipe.

DESCRIPTION OF THE DRAWINGS

The details of the invention may best be understood in reference to the drawings in which.

DESCRIPTION OF PRESENT INVENTION

Figure 1:
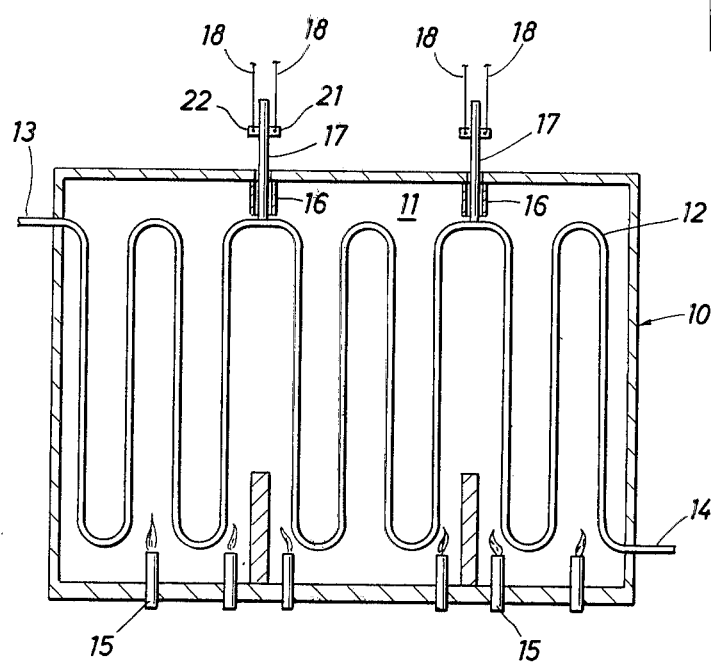
FIG. 1 is a schematic illustration of a furnace in which the present invention is utilized.

The furnace 10 in FIG. 1 is illustrated in vertical cross-section and includes sides and top and bottom walls. The interior 11 of the furnace 10 has one or more continuous pipes 12 which are disposed in a vertical plane and have a tortuous path through the furnace. The inlet 13 of the pipe 12 receives the input liquid such as kerosene and the outlet 14 of the pipe discharges a gas. Burners 15 supply the heat for the process. In the top wall are downwardly extending openings 16. Passing through the openings 16 are the temperature sensors 17 of the present invention. The sensors are supported by hangers 18 on the exterior of the furnace.

Figure 2:
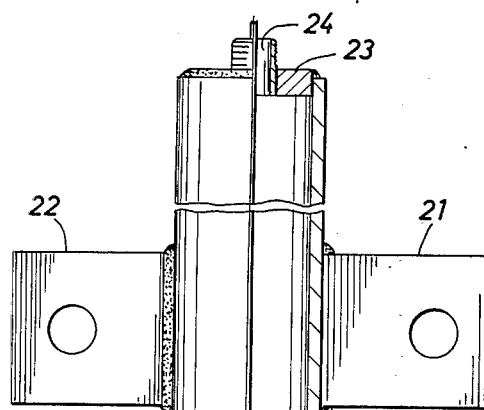
FIG. 2 is a view in cross-section of a temperature sensing system which illustrates the present invention.
Figure 2:
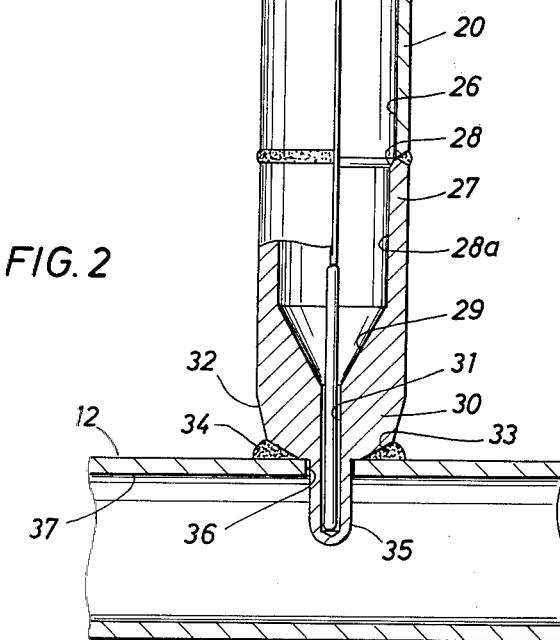

Referring now to FIG. 2, a sensor 17 is illustrated in relation to its supporting function of a pipe 12 and also its temperature sensing function. The sensor 17 consists of an upper cylindrical tube 20 comprised of alloy 800H material in accordance with ASTM code case 1325-9 which is 19% chrome, 35% nickel and 46% iron. Near the upper end of the sensor 17 are transverse trunions 21 and 22 which are welded to the sensor 17 and provide means for supporting the sensor 17 on the exterior of a furnace. The upper end of the pipe has a closure member 23 and an inlet member 24 which permits insertion of a thermocouple wire 25 through the pipe 17.

The lower end of the tube 20 is welded to a pipe section 27 which has a substantially thicker wall thickness. The welding material is 625 ASW chrome nickel iron material which is 65% nickel; 22% chrome and 13% iron. ASW 625 is an American Society designation of ERNICRNO-3. Thus, the inner wall 26 of tube 20 joins an inner wall 28 a of Section 27. Section 27 is made long enough to place the weld 28 between tube 17 and section 27 on the exterior (or above) the top wall of the furnace.

The lower end of the pipe section 27 has a thickened section 30 with a small center bore 31 to receive the thermocouple wire 25. The lower part of the section 30 has a first outer relief taper section 32 and a weld taper section 33 which joins a transverse shoulder surface. A tubular sensing member 35 projects downwardly from the transverse shoulder surface.

The pipe 12 is provided with an opening 36 to receive the sensing member 35 and the sensing member 35 is sized to terminate short of the center line of the pipe. In addition, the wall thickness of the member 35 is made adequate to resist the flow and temperature of the fluids in relation to the wall thickness of the pipe 12. As illustrated, the thermocouple wire 25 projects into the member 35.

The weld bevel 33 permits a weld 34 of 625 material to attach the tube 12 to the sensor body 17. The thickness of the tip portion 30 permits guiding by the tapered surface 29 to insert the thermocouple wire into the member 35.

In the present invention, the section 27 below the weld to tube 17 is made of alloy 800H material and is sufficiently massive in size within the furnace to resist stress rupture failure or creep rupture failure due to the temperature of 2000 degrees F. involved in the process. The use of the same material in tube 17 and section 27 minimizes temperature effects. In the thermowell, the section 27 attaches to and supports the piping 12 in a furnace. The one material construction reduces the temperature effect and permits matching of the life of the material in the furnace to the life of the pipe 12. Pipe 12 is typically made of HK40 material which is 25% chrome; 25% nickel, and 50% iron.

The interior of the tube 17 and section 27 permit easy insertion and removal of the thermocouple wire 25 to the tip 35. The tip 35 is permanently positioned and constructed of material to withstand the volume of flow and temperature involved in the process.

While only selected embodiments of the present invention are illustrated and described herein, other embodiments of the invention are contemplated and many changes and modifications of the inventions may be made within the scope of the appended claims without departing from the spirit of the invention.

I CLAIM:

1. A thermowell apparatus for use in sensing temperature and supporting piping in a cracker furnace including, a one piece tubular assembly comprised of an upper tubular support member and a lower tubular sensor member with hollow interiors, said members being constructed of like materials and having a welded end-to-end interconnection, said welded interconnection being spaced from a tip of said sensor member a sufficient distance to dispose said welded connection and said tubular support member on the exterior of the outer wall of a cracker furnace when said tubular sensor member is attached to a furnace pipe, said tubular support member having a wall thickness sufficient to provide a supporting function for a furnace pipe under temperature conditions which exist exterior to the outer wall of a cracker furnace, said tubular sensor member having a wall thickness sufficient to provide a weight supporting function for a furnace pipe within a cracker furnace at temperature conditions up to 2000 degrees F.

the tip of said tubular sensor member having an elongated, hollow tip portion for insertion into an opening in the upper surface of a furnace pipe for temperature measuring purposes and having a radially enlarged solid metal portion adjacent said tip portion, said metal portion having a 30 degree welding bevel for permitting a welding attachment of said enlarged metal portion to a furnace pipe, said hollow tip portion having an opening sized to receive a thermocouple member.

2. The apparatus as defined in claim 1 wherein the length of said hollow tip portion, when the sensor member is attached to a furnace pipe, is sized to project into the furnace pipe to a location short of the center line of the furnace pipe.

3. The apparatus as defined in claim 1 wherein said tubular assembly is constructed from 800H alloy material in accordance with ASTM code case 1325-9.

4. The apparatus as defined in claim 1 wherein the length and mass of said radially enlarged solid metal portion is sufficient to resist the effects of high temperature within a cracker furnace.

* * * * *